United States Patent [19]

Holzmann et al.

[11] Patent Number: 5,207,487
[45] Date of Patent: May 4, 1993

[54] HYDRAULIC MULTI-CIRCUIT BRAKE SYSTEM IN PARTICULAR FOR MOTOR VEHICLES

[75] Inventors: Roland Holzmann, Stuttgart; Karl-Heinz Willmann, Freiberg/N, both of Fed. Rep. of Germany

[73] Assignee: Robert Bosch GmbH, Stuttgart, Fed. Rep. of Germany

[21] Appl. No.: 895,062

[22] Filed: Jun. 8, 1992

[30] Foreign Application Priority Data

Jun. 7, 1991 [DE] Fed. Rep. of Germany ....... 4118719

[51] Int. Cl.$^5$ ............................................. B60T 8/34
[52] U.S. Cl. .............................. 303/113.2; 303/116.1; 303/119.1
[58] Field of Search ................... 303/113 TR, 113 TB, 303/113 SS, 116 R, 116 SP, 116 PC, 116 WP, 119 R, 113 R, 10-12, DIG. 5, DIG. 6, 113.2, 116.1, 119.1, 113.3, 116.2, 116.3, 119.2; 180/197

[56] References Cited

U.S. PATENT DOCUMENTS

| 5,026,124 | 6/1991 | Resch | 303/113 TR |
| 5,102,205 | 4/1992 | Stegmaier | 303/116 R X |
| 5,123,716 | 6/1992 | Willmann | 303/113 TR |
| 5,131,730 | 7/1992 | Kollers et al. | 303/113 TR |

FOREIGN PATENT DOCUMENTS 4034113 4/1992 Fed. Rep. of Germany .

Primary Examiner—Douglas C. Butler
Attorney, Agent, or Firm—Edwin E. Greigg; Ronald E. Greigg

[57] ABSTRACT

A brake system equipped with an anti-lock and traction control system including first shutoff valve and a first inlet valve of a valve assembly for brake pressure modulation are disposed in a first brake line connected with a master brake cylinder and a wheel brake. Toward the wheel brake, a third return line having a first outlet valve of the first valve assembly begins at the first brake line and leads to a first high-pressure pump, which pumps fluid into the first brake line. On the intake side, the pump communicates with the master brake cylinder, through a suction line having a charging valve. For brake pressure modulation in the traction control mode, phases for pressure buildup, pressure holding and pressure reduction can be controlled with the high-pressure pump, the first shutoff valve, the charging valve and the first inlet valve, while the first outlet valve assumes its shutoff position. A first storage chamber connected to the third return line therefore remains free of pressure fluid. The hydraulic multi-circuit brake system can be used in particular in motor vehicles.

1 Claim, 1 Drawing Sheet

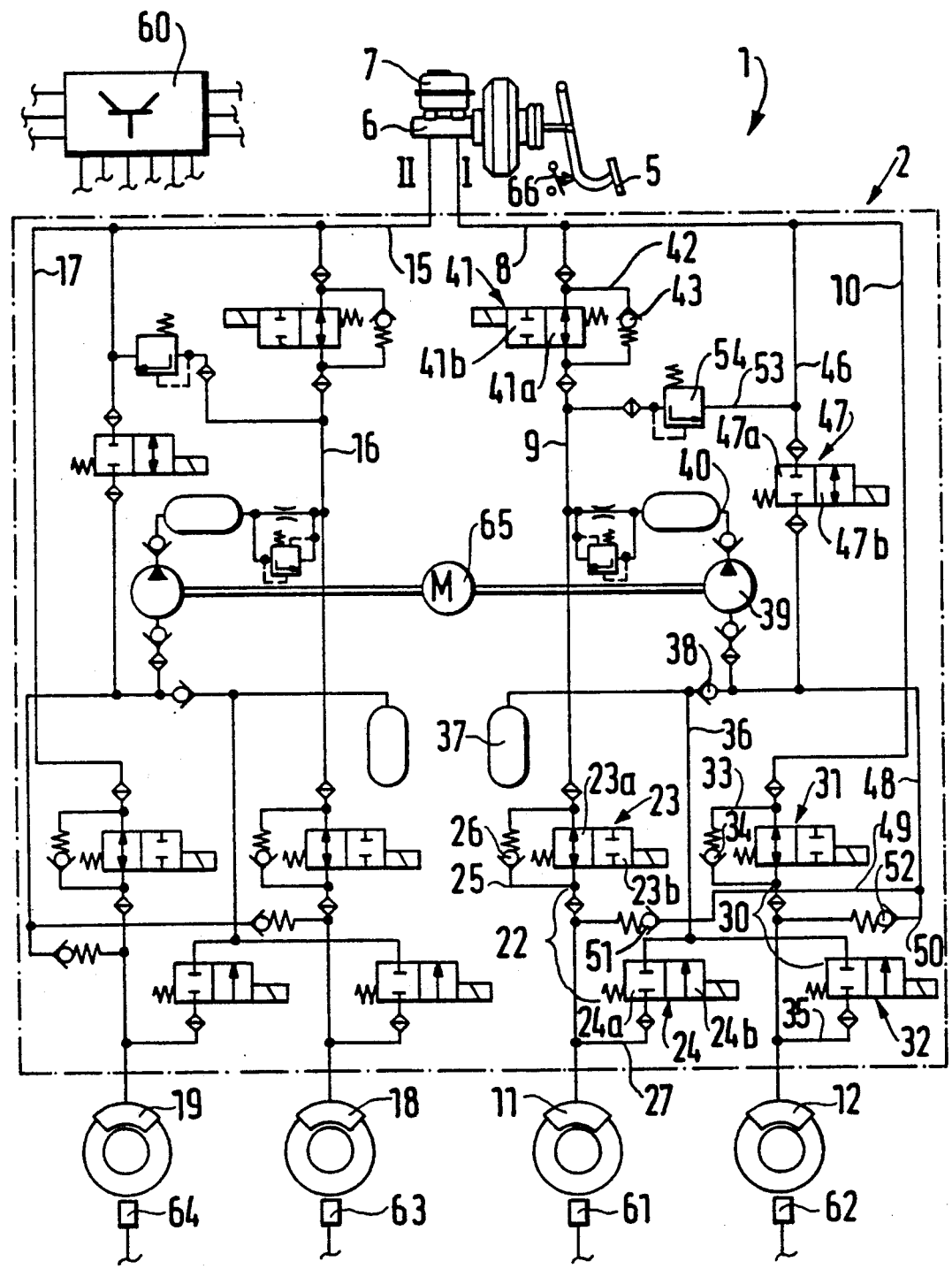

5,207,487

HYDRAULIC MULTI-CIRCUIT BRAKE SYSTEM IN PARTICULAR FOR MOTOR VEHICLES

BACKGROUND OF THE INVENTION

The invention is based on a hydraulic multi-circuit brake system having an anti-lock and traction control system.

Such a brake system has already been proposed (German Patent Application P 40 34 113.5), in which in the traction control mode, in pressure reduction phases, pressure fluid is let out of the wheel brake of the driven wheel subjected to the excessively high slip, by switching of the outlet valve to the open position. If the vehicle driver effects braking during the traction control mode, and if because of a malfunction the traction control mode is not interrupted, then the brake pressure generated by the driver acts, through the suction line and the charging valve located in it and continuing to occupy its open position, upon the check valve disposed between the high-pressure pump and the storage chamber, and prevents that valve from opening, so that pressure fluid held in the storage chamber is not aspirated by the high-pressure pump, and the storage chamber cannot be evacuated. If the driver then increases the brake pressure, and the brake driven wheel threatens to lock, then with the onset of the anti-lock mode, the rapid brake pressure reduction in the wheel brake may be impaired since the storage chamber is not capable of receiving the pressure fluid flowing out of the wheel brake.

OBJECT AND SUMMARY OF THE INVENTION

The hydraulic multi-circuit brake system according to the invention has an advantage over the prior art that even in the above-described instance of malfunction an undelayed brake pressure reduction in the anti-lock mode is possible, because filling of the storage chamber is averted in the traction control mode. Moreover, the delay times in the pressure buildup phases are short in the traction control mode, since the high-pressure pump furnishes pressure fluid to the brake line continuously. The invention will be better understood and further objects and advantages thereof will become more apparent from the ensuing detailed description of a preferred embodiment taken in conjunction with the drawing.

BRIEF DESCRIPTION OF THE DRAWING

The single figure of the drawing schematically shows an exemplary embodiment of the invention, in the form of a circuit diagram for a hydraulic multi-circuit brake system for motor vehicles.

DESCRIPTION OF THE PREFERRED EMBODIMENT

A hydraulic multi-circuit brake system 1 for motor vehicles, shown in the drawing, is equipped with an anti-lock and traction control system 2.

The brake system 1 has a master brake cylinder 6, actuatable with a brake pedal 5 and having a pressure fluid supply container 7. A main brake line 8 of a first brake circuit I begins at the master brake cylinder 6. The brake line 8 is split into first and second brake lines 9 and 10. First brake line 9 leads to a wheel brake 11 of a driven vehicle wheel, not shown, of the front axle. The second brake line 10 communicates with a wheel brake 12 of a nondriven wheel, likewise not shown, of the rear axle of the vehicle.

A main brake line 15 of a second brake circuit II begins at the master brake cylinder 6. The main brake line 15 is continued in the form of third and fourth brake lines 16 and 17. The third brake line 16 ends at a wheel brake 18 of the other driven vehicle wheel, not shown, of the front axle of the vehicle. The fourth brake line 17 communicates with a wheel brake 19 of the second wheel, likewise not shown, of the nondriven rear axle of the vehicle. The first and second brake circuits I and II have so-called diagonal distribution: that is, in each brake circuit, one front wheel and the diagonally opposed rear wheel are braked. For example, in brake circuit I, the wheel brake 11 is assigned to the left front wheel and the wheel brake 12 to the right rear wheel. In brake circuit II, the wheel brake 18 is then assigned to the right front wheel and the wheel brake 19 to the left rear wheel. Since except for the assignment of the wheel brakes both brake circuits I and II are equipped identically, only brake circuit I will be described in detail below.

The wheel brake 11 of the driven left front wheel has a first valve assembly 22 for brake pressure modulation assigned to it. The first valve assembly 22 comprises a first inlet valve 23 and a first outlet valve 24. The first inlet valve 23, disposed in the first brake line 9, is embodied as a 2/2-way valve, with a spring-actuated open position 23a and an electromagnetically switchable shutoff position 23b. Parallel to the first inlet valve 23, there is a first bypass line 25 with a first check valve 26, which allows a flow from the wheel brake 11 to the master brake cylinder 6. The first outlet valve 24 of the first valve assembly 22 is likewise a 2/2-way valve, with a spring-actuated shutoff position 24a and an electromagnetically switchable open position 24b. The first outlet valve 24 is located in a first return line 27 for pressure fluid that flows from the first brake line 9 between the first inlet valve 23 and the wheel brake 11.

In the same way, a second valve assembly 30 for brake pressure modulation is assigned to the wheel brake 12 of brake circuit I. This second valve assembly likewise comprises a second inlet valve 31 and a second outlet valve 32, which correspond in structural form and function to the first inlet valve 23 and the first outlet valve 24 of the valve assembly 22. Extending parallel to the second inlet valve 31 of the second valve assembly 30 is a second bypass line 33, with a second check valve 34 that once again allows a flow from the wheel brake 12 to the master brake cylinder 6. The second outlet valve 32 is located in a second return line 35 that begins at the brake line 10 between the second inlet valve 31 and the wheel brake 12. The first return line 27 and the second return line 35 are joined to make a third return line 36, to which a first storage chamber 37 for receiving pressure fluid is connected. A third check valve 38 is disposed in the third return line 36 downstream of the connection of the first storage chamber 37. This third check valve 38 permits a flow from the first outlet valve 24, and the second outlet valve 32 of the first valve assembly 22, and the second valve assembly 30 to the intake side of a self-aspirating high-pressure pump 39, to which the third return line 36 is connected. A first feed line 40 for pressure fluid begins at the pressure side of the high-pressure pump 39 and discharges into the first brake line 9 between the first valve assembly 22 and the master brake cylinder 6. A shutoff valve 41 is disposed in the first brake line 9, between the master brake cylinder 6 and the connection of the first feed line 40. The shutoff valve 41 is embodied as a 2/2-way valve with a spring-actuated open position 41a and an electromagnetically switchable shutoff position 41b. A fourth check valve 43 with its open direction from the master brake cylinder 6 to the wheel brake 11 is disposed in a third bypass line 42 that bypasses the shutoff valve 41.

The high-pressure pump 39 also communicates, through a suction line 46, with the master brake cylinder 6 and its pressure fluid supply container 7. The suction line 46 begins at the second line 10 and is connected to the third return line 36 between the third check valve 38 in the high-pressure pump 39. A charging valve 47, in the form of a 2/2-way valve with a spring-actuated shutoff position 47a and an electromagnetically switchable open position 47b is located in the suction line 46. The first main brake line 8 begins at the suction line 46, between its connection to the return line 46 and the charging valve 47. The suction line 46 is split into first and second auxiliary brake lines 49 and 50. The first auxiliary brake line 4 discharges into the first brake line 9 between the first inlet valve 23 of the first valve assembly 22 and the wheel brake 11. The second auxiliary brake line 50, contrarily, is connected to the second brake line 10 between the second inlet valve 31 of the second valve assembly 30 and the wheel brake 12. A fifth check valve 51 is disposed in the auxiliary brake line 49, and a sixth check valve is disposed in the second auxiliary brake line 50, with their open direction from the master brake cylinder 6 to the applicable wheel brakes 11, 12. Also beginning at the suction line 46 between the master brake cylinder 6 and the charging valve 47 is an overflow line 53, which is connected to the first brake line 9 between the shutoff valve 41 and the connection of the feed line 40. A first pressure limiting valve 54, with which pressure fluid can be diverted from the first brake line 9 to the suction line 46 o to the master brake cylinder 6 and the pressure fluid supply container 7 is located in the overflow line 53.

The anti-lock and traction control system 2 of the brake system 1 also has an electronic control unit 60, which monitors the rotation of the vehicle wheels, not shown, by means of rpm sensors 61 to 64 and switches the various valves and an electric drive motor 65 for the high-pressure pump 39 in accordance with predetermined control algorithms during anti-lock and traction control. A brake light switch 66 that can be actuated by the brake pedal is also connected to the control unit 60.

The hydraulic multi-circuit brake system 1 having the anti-lock and traction control system 2 has the following functions:

In the course of braking initiated by the vehicle driver by actuation of the brake pedal 5, during which braking the valves of the brake system 1 assume the positions shown, pressure is generated in the master brake cylinder 6. By the displacement of quantities of pressure fluid in the first main brake line 8, and the first and second brake lines 9, 10 of brake circuit I and the second main brake line 15, and the third and fourth brakes lines 16, 17 of brake circuit II, brake pressure becomes effective in the wheel brakes 11, 12, 18, 19. In this process, the control unit 60 monitors the rotation of the vehicle wheels, based on the signals of the rpm sensors 61-64.

For instance, if upon such a brake event the driven vehicle wheel associated with wheel brake 11 threatens to lock, then the control unit 60 switches the first valve assembly 22 for brake pressure modulation into phases for pressure reduction, pressure holding and pressure buildup in the wheel brake 11. In the phase for pressure reduction, the first inlet valve 23 assumes its shutoff position 23b and the first outlet valve 24 assumes its open position 24b. Pressure fluid can now flow out of the wheel brake 11 through the first return line 27 and the third return line 36 into the first storage chamber 37, so that the brake pressure in the wheel brake 11 decreases. The high-pressure pump 39, simultaneously turned on by the control unit 60, pumps the pressure fluid drawn from the wheel brake 11 through the feed line 40 back into the first brake line 9. In an ensuing pressure holding phase, the first inlet valve 23 and the first outlet valve 24 occupy their respective shutoff positions 23b and 24a In a phase for pressure buildup, contrarily, the first inlet valve 23 assumes its open position 23a, while the first outlet valve 24 remains in its shutoff position 24a. In accordance with the control algorithm for anti-lock control, stored in memory in the control unit 60, these phases succeed one another until the driven vehicle wheel exhibits stable rotation. Once such an anti-lock mode has ended and the first storage chamber 37 has been evacuated of pressure fluid, the control unit turns off the drive motor 65 of the high-pressure pump 39. The valves of the brake system 1 likewise resume their positions shown.

Contrarily, if upon startup and acceleration of the vehicle the vehicle wheel associated with the wheel brake 11 should threaten to spin, then this is likewise recognized by the control unit 60 from the signals of the rpm sensors 61 to 64. In accordance with the control algorithm for traction control stored in memory in the control unit 60, phases for pressure buildup, pressure holding and pressure reduction in the wheel brake 11 are now selected. In the phase for pressure buildup, the shutoff valve 41 assumes its shutoff position 41b, the charging valve 47 assumes its open position 47b and the first inlet valve 2 of the first valve assembly 22 assumes its open position 23a, while the first outlet valve 24 of the first valve assembly 22 remains in its shutoff position 24a. At the same time, the control unit 60 turns on the drive motor 65 of the high-pressure pump 39. This pump aspirates pressure fluid from the supply container 7 of the master brake cylinder 6, through the suction line 46 and the second brake line 10, and the first main brake line 8, and pumps it through the feed line 40 into the first brake line 9. In a phase for pressure holding, the shutoff valve 41 assumes its shutoff position 41b, the charging valve 47 assumes its open position 47b, and the first inlet valve 23 of the first valve assembly 22 assumes its shutoff position 23b, while the first outlet valve 24 of the first valve assembly 22 continues to remain in its shutoff position 24a. Pressure fluid continuing to be aspirated by the high-pressure pump 39 is diverted to the suction line 46, through the overflow line 53 and the first pressure limiting valve 54. In a phase for pressure reduction in the wheel brake 11, the first shutoff valve 41 assumes its open position 41a, and the charging valve 47 assumes its open position 47b. The first outlet valve 24 of the first valve assembly 22 also remains in its shutoff position 24a. The first inlet valve 23 of the first valve assembly 22 can occupy either its open position 23a or its shutoff position 23b. In the first case, pressure fluid can flow out of the wheel brake 11 through the first inlet valve 23 to the supply container 7 of the master brake cylinder 6; in the second case, the first inlet valve 23 is bypassed by the first bypass line 25. Once the traction control mode has ended, the control unit 60 turns off the drive motor 6 of the high-pressure pump 39.

Since the first outlet valve 24 of the first valve assembly 22 has occupied its shutoff position 24a during the traction control mode in all the phases of brake pressure modulation, no pressure fluid has been delivered to the first storage chamber 37. It is therefore unnecessary for the first storage chamber 37 to be evacuated by the high-pressure pump 39. In this kind of traction control mode, for instance at the wheel brake 11, if the driver initiates braking by depressing the brake pedal 5, this is recognized by the control unit 60 from the closure of the brake light switch 66. The control unit 60 switches the first shutoff valve 41 into the open position 41a and the charging valve 47 into the shutoff position 47a. The first inlet valve 23 of the first valve assembly 22 is also switched into the open position 23a. The brake pressure generated by the master brake cylinder 6 can now become operative in all the wheel brakes 11, 12, 18, 19 of the vehicle. However, until the switchover of the valves involved in the above-mentioned traction control mode in brake circuit I, in particular the switchover of the first inlet valve 23 to the open position 23a, brake pressure can already be fed from the master brake cylinder 6 into the wheel brake 11 of the driven vehicle wheel through the suction line 46, the charging valve 47 which still occupies its open position 47b, the auxiliary brake lines 48, 49, and the check valves 51.

If the brake light switch 66 should malfunction or if there is some (limited) malfunction in the control unit 60, a continuation of the traction control mode can occur incorrectly, even though the driver is initiating braking, especially if he is a driver who uses both feet, in other words one who actuates the accelerator, not shown and the brake pedal 5 at the same. Pressure generated in the master brake cylinder 6 can nevertheless become operative in all the wheel brakes 11, 12, 18, 19, either over the lines used in normal braking or by way of the corresponding auxiliary brake lines 48, 49, 50. As mentioned above, despite the persistence of the traction control mode, for instance at the wheel brake 11, filling of the storage chamber 37 with pressure fluid cannot occur, because the first outlet valve 24 in this operating situation continuously occupies its shutoff position 24a. If the driver increases the brake pressure, then the danger of wheel locking can arise, for instance at the vehicle wheel associated with the wheel brake 11. In that case, the control unit 60 stops the traction control mode and begins the anti-lock control mode by initiating a phase for brake pressure reduction at the wheel brake 11. The brake pressure reduction can become operative immediately, because after the switching of the first outlet valve 24 of the first valve assembly 22 into the open position 24b, the pressure fluid drawn from the wheel brake 11 is received in the empty storage chamber 37. Since the control unit 60 simultaneously switches the charging valve 47 into the shutoff position 47a, the high-pressure pump 39 can relieve the pressure on the third check valve 38 and aspirate the pressure fluid from the first storage chamber 37 and pump it into the first brake line 9 through the feed line 40. Except for these features, the traction control mode then proceeds as described above.

The foregoing relates to a preferred exemplary embodiment of the invention, it being understood that other variants and embodiments thereof are possible within the spirit and scope of the invention, the latter being defined by the appended claim.

What is claimed and desired to be secured by Letters Patent of the United States is:

1. A hydraulic multi-circuit brake system (1), for motor vehicles, having an anti-lock and traction control system (2) for driven and non-driven wheels, which includes:
   a master brake cylinder (6), first and second brake circuits (I, II) which originate at said master brake cylinder, said first main brake circuit (I) includes a main brake line (8) and a branch line (9) which connect with a wheel brake (11) of said driven vehicle wheels;
   a valve assembly (22), assigned to the wheel brake (11), for brake pressure modulation which includes phases for pressure buildup, pressure holding and pressure reduction, the valve assembly comprises an inlet valve (23), disposed in the branch line (9), and having an open position (23a) and shutoff position (23b), and an outlet valve (24), having a shutoff position (24a) and an open position (24b), wherein the outlet valve (24) is disposed in a return line (27, 36) for pressure fluid that begins at the branch line (9) between the inlet valve (23) and the wheel brake (11);
   a bypass line (25 that bypasses the inlet valve (23), said bypass line (25) includes a first check valve (26) which allows a flow from the wheel brake (11) to the master brake cylinder (6);
   a storage chamber (37), connected to the return line (36), for receiving pressure fluid drawn from the wheel brake (11) in the anti-lock control mode;
   a high-pressure pump (39), which communicates on an intake side with the return line (36) and a suction line (46) for pressure fluid and on a pressure side with a feed line (40) for pressure fluid, which feed line (40) discharges into the branch line (9) between the main brake line (8) connected to the master brake cylinder (6) and the valve assembly (22);
   a second check valve (38), disposed in the return line (36) between a connection of the storage chamber (37) and a connection of the suction line (46), said second check valve permits a fluid flow from the outlet valve (24) to the high-pressure pump (39);
   a shutoff valve (41), disposed in the branch line (9) between the main line (8) and the master brake cylinder (6) and a connection of the feed line (40) and having an opening position (41a) and a shutoff position (41b);
   a charging valve (47), having a shutoff position (47a) and an open position (47b), disposed in the suction line (46), which communicates with the main brake line (8) between the shutoff valve (41) and the master brake cylinder (6);
   and an overflow line (53), at least indirectly bypassing the shutoff valve (41), having a pressure limiting valve (54) that diverts pressure fluid toward the master brake cylinder (6);
   in the traction control mode, the high-pressure pump (39) is driven continuously;
   in the traction control mode,
   a) in a pressure buildup phase in the wheel brake (11), the shutoff valve (41) assumes the shutoff position (41b) and the charging valve (47) and the inlet valve (23) assume the open positions (47b, 23a);
   b) in a phase for pressure holding, the shutoff valve (41) and the inlet valve (23) assume the shutoff position (41b, 23b) and the charging valve (47) assumes the open position (47b), and c) in the phase for pressure reduction, the shutoff valve (41) and the charging valve (47) assume the open position (41a, 47b) and the inlet valve (23) assumes an arbitrary position, while in all three phases, the first outlet valve (24) assumes its shutoff position (24a).

* * * * *